Patented Mar. 16, 1926.

1,577,187

UNITED STATES PATENT OFFICE.

WALTER A. PATRICK, OF MOUNT WASHINGTON, MARYLAND, ASSIGNOR TO THE SILICA GEL CORPORATION, OF BALTIMORE, MARYLAND, A CORPORATION OF MARYLAND.

METHOD OF PREPARING CATALYTIC AGENTS.

No Drawing. Application filed November 18, 1922. Serial No. 601,866.

*To all whom it may concern:*

Be it known that I, WALTER A. PATRICK, a citizen of the United States, and residing at Mount Washington, Baltimore County, State of Maryland, have invented certain new and useful Improvements in Methods of Preparing Catalytic Agents, of which the following is a specification.

This application, which is a continuation in part of application 467,668, filed May 7, 1921, relates to a process of preparing catalytic agents comprising a carrier and catalytic material associated therewith and carried thereby.

Gels, such as silica gel, if properly prepared are hard, porous products, the pores being ultra-microscopic. It is difficult to define the size of these pores because they are so very fine. For this purpose, however, reference may be had to the amount of water present in one gram of material when in equilibrium with water vapor under definite conditions of temperature and partial pressure.

A liquid that wets a capillary tube will rise in the tube above the level of the surface of the liquid surrounding the same, the extent of the rise varying with the diameter of the tube. The vapor pressure of the liquid inside the tube is smaller than the vapor pressure at the level surface of the liquid outside the tube. This lowering of the vapor pressure by the liquid within the capillary tube is not appreciable until the diameter of the tube is extremely small, and the smaller the bore of the tube, the greater the decrease in vapor pressure. The amount of water present or adsorbed by a porous body when in equilibrium with water vapor at a given temperature and partial pressure depends both upon the size of the pores and upon the total interior volume of the pores. By determining the amount of a given material, water for example, which may be adsorbed by two different porous bodies under the same conditions of temperature and partial pressure, we have a means of comparing the size and volume of the pores in the two adsorbents. For example one gram of silica gel has a total internal volume of about 0.41 c. c. In other words, if we completely fill the pores in silica gel with water, the amount of water present in the gel will be approximately 41% of its initial weight. Furthermore, a sufficient percentage of the total internal volume in silica gel is made up of pores of such size that the gel will hold at 30° C. at least 21% of its own weight of water when in equilibrium with water vapor at a partial pressure of substantially 22 mm. of mercury. Kieselguhr and boneblack under the above conditions will hold practically no water. Highly activated charcoal such as cocoanut charcoal will retain more water than the silica gel mentioned above. It follows therefore that kieselguhr and boneblack have practically no pores as small as the greater part of the pores in silica gel. On the other hand, highly activated charcoal has more small pores than silica gel.

So the porous structure of the gels employed in the invention is such that there is present in the gel at least 21% of its own weight of water when it is in equilibrium with water vapor at 30° C. and at a partial pressure of substantially 22 mm. of mercury. Silica gel prepared as directed in Patent No. 1,297,724 has this structure.

In my application Serial No. 362,168, filed February 28, 1920, I have disclosed and claimed methods of preparing catalysts of the type obtained by the present process. The product as a new composition is claimed in application Serial No. 715,727, a division of application Serial No. 362,138. The method described in this prior application, consists in combining, with materials from which the gel is obtained, a substance or substances which will produce or give the catalytic agent in intimate association with the gel.

In my application Serial No. 466,998, filed May 5, 1921, I have disclosed another class of processes wherein a gel in substantially its final state of manufacture, is impregnated with a catalytic agent. Another species of this class of processes is disclosed in my application Serial No. 601,867, filed November 18, 1922.

The present invention comprehends still another process. Thus according to the present invention, the gel may be taken at an intermediate stage of its manufacture and so treated as to be impregnated with one or more catalytic materials. A gel such as silica gel, in its final state of manufacture is a hard, porous material, containing from 3 to 12% water and has high adsorptive properties not only for gases, as described in Patent No. 1,335,348, but also for selectively taking up dissolved matter from solutions. In making the gel, the solution obtained by mixing the ingredients is termed a "sol". If water is the solvent then the solution is a "hydrosol". The jelly-like mass into which the hydrosol may be caused, by suitable treatment, to harden or set, is termed "hydrogel". This "hydrogel" when properly dried gives a "gel". The hydrogel contains 90% or so water whereas the gel has only a fraction of this, say 3 to 12%.

I have discovered that the hydrogel likewise has the power of selectively adsorbing certain substances, notably alkali metal hydroxides, from aqueous solution. The hydrogel after having been washed in running water to free it completely from acid and salt, if placed within a dilute solution of sodium hydroxide will take up the sodium hydroxide to a very considerable extent out of the solution; and a thorough study of the phenomena has shown that the curve representing the relation between the amount of sodium hydroxide taken up by the gel and the concentration of the solution with respect to the sodium hydroxide is similar in all respects to the usual adsorption curve. The experimental evidence shows conclusively that the action is not a chemical one but is a case of true adsorption.

The table below shows the adsorption of sodium hydroxide by the hydrogel of silicic acid from dilute solutions. 25 grams of hydrogel were in all cases treated with 100 c.c. of the solution and allowed to stand at room temperature till equilibrium was established. This occurred always within 24 hours, no further change in concentration occurring thereafter.

| Experiment No. | Original molar conc. of NaOH. | Conc. at end of 24 hours. | Grams of adsorbed NaOH. |
| --- | --- | --- | --- |
| 1 | 0.0045 | 0.0 | 0.0180 |
| 2 | 0.0110 | 0.0006 | 0.0416 |
| 3 | 0.0192 | 0.0032 | 0.0640 |
| 4 | 0.0270 | 0.0058 | 0.0848 |
| 5 | 0.0390 | 0.0084 | 0.1224 |
| 6 | 0.0500 | 0.0155 | 0.1380 |

When these results are plotted graphically the curve has the form of a typical adsorption isotherm. Moreover, the phenomena are reversible. That is, if a hydrogel which has adsorbed a large amount of alkali is brought in contact with a solution the concentration of which is less than the equilibrium concentration, and allowed to stand till equilibrium is reached we will obtain a point which falls on the curve. By proceeding in this way we may reproduce the entire curve reversibly. It is to be noted, however, that the ratio of the concentration of alkali in the hydrogel to the concentration in the solution with which it is in equilibrium is very large and that this ratio increases rapidly with increasing dilution. Thus in experiment 4 this ratio is approximately 15 while in experiment 2 it is about 70. It follows therefore that while it is possible readily to remove a part of the alkali which has been taken up by the hydrogel by repeatedly washing with water, complete removal by washing would be extremely difficult, if not impossible, since as seen in experiment 2, 25 grams of hydrogel containing 0.0416 grams of alkali is in equilibrium with an extraordinarily dilute solution (0.0006 molar) while in experiment 1 the same amount of gel containing 0.018 grams of alkali is in equilibrium with a solution neutral to phenolphthalein.

Similar phenomena do not occur either with ordinary acids or salts. Thus if a hydrogel of silicic acid is brought into contact with a dilute solution of hydrochloric or sulphuric acid or an ordinary salt such as ferric nitrate, there is apparently no adsorption, though of course the acid or salt will slowly diffuse into the hydrogel and after standing till equilibrium is reached, the concentration of the solution will be found to be less than the original concentration due to simple dilution. Hence as described in my Patent No. 1,297,724, it is a comparatively simple matter to wash a hydrogel free of hydrochloric or sulphuric acid and such salts as sodium chloride or sodium sulphate, because these substances are not adsorbed in the hydrogel but are apparently in a state of ordinary solution in the water present.

The present invention is based upon the discovery described above, viz., that a hydrogel similar to the hydrogel of silicic acid is capable of adsorbing from a very dilute water solution considerable quantities of alkali metal hydroxides, while it will not adsorb ordinary acids and salts, and the further observation that this adsorbed alkali is readily capable of reacting with salts when the latter are allowed to diffuse into the hydrogel to form either the oxide, hydroxide or a basic salt. As a result of this discovery I have devised a distinctly new method of preparing a catalyst.

I will describe my method in detail as applied to making a catalyst consisting of silica gel impregnated with iron oxide. The hydrogel, after being washed free of acid and salt is treated with a sufficient volume of sodium hydroxide solution so that the hydrogel is just submerged. The concentration of the sodium hydroxide solution which I ordinarily employ ranges between 0.005 N and 0.05 N. On standing 8 to 10 hours practically all the alkali is adsorbed by the gel. The neutral or nearly neutral liquid is drained off, the hydrogel rinsed with water and submerged in a 0.1 molar solution of ferric nitrate for 5 to 6 hours. The solution is again drained off, the impregnated hydrogel washed in running water to remove salts (sodium nitrate and ferric nitrate) and dried. The drying may be effected at 75° to 120° C., or the hydrogel may be dried at 75° to 120° C. and thereafter the temperature increased to 400° C. If desired, the drying may be effected in vacuum or by heating in vacuum.

The limits of concentration of the alkali used as stated, lie between 0.005 N and 0.05 N. The exact concentration used depends upon the amount of alkali I desire to introduce in the hydrogel and this in turn depends upon the amount of catalytic material which I may have to have in my finished product. If I wish to introduce a very active catalyst, of which only a small trace is sufficient, I may use a concentration of alkali less than 0.005 N though in general a concentration not less than 0.005 N is employed. If the alkali concentration is too great the hydrogel appears to be attacked chemically and the resulting product is inferior. In general I prefer to use a concentration of alkali not exceeding 0.05 N as this introduces a sufficient amount of alkali for most purposes and there is no danger of injurious chemical action. The fact that I am able to introduce a large amount of alkali by the use of very dilute solution of sodium hydroxide (0.005 N) distinguishes my method from all previous methods of impregnating carriers with catalytic agents.

When the hydrogel, with its adsorbed alkali metal hydroxide (after being washed as previously stated) is soaked in a salt solution, such as ferric nitrate, the latter diffuses into the mass and reacts with the alkali present giving either ferric hydroxide or basic ferric nitrate, or both, which are insoluble in water and are not removed by the subsequent washing described. The concentration of the salt solution is immaterial, the essential condition being that the solution must contain at least sufficient salt to react with all the alkali present in the hydrogel. During the drying process the basic ferric nitrate is decomposed with formation of ferric hydroxide or ferric oxide and copious evolution of oxides of nitrogen. The final state of the iron is either ferric oxide or ferric hydroxide, depending upon the temperature to which the mass is heated.

The drying may be accomplished in a variety of ways but preferably in the manner described in my Patent No. 1,297,724; that is to say, it is dried to remove a portion of the moisture by passing a stream of air at 75° to 120° C. over the same. Further moisture is then removed by increasing the temperature of the air slowly up to 300° to 400° C. The hydrogel, of course, could be dried at lower temperature, that is 100° C. or above, but this will require a much longer time.

The physical state of the catalyst thus produced is such that it is many times as active as other catalysts, per unit weight of active material. For example, a catalyst comprising silica gel impregnated with iron as above described gives 90% conversion of $SO_2$ to $SO_3$ when a 7% mixture of sulphur dioxide and air is used, but only a fraction as much of the active material is required as heretofore to do the same work.

I have described the details of my invention as applied to impregnating silica gel with iron oxide, but I do not desire to limit my invention either to silica gel as the carrier or to iron oxide as the catalytic material. By substituting other salts in place of ferric nitrate, I am able in substantially the same way to impregnate silica gel with the oxide of almost any metal whose hydroxide has a low solubility. I have prepared in this way a large number of catalysts including gels in which the impregnating materials are aluminum oxide, copper oxide, manganese oxide, silver oxide, magnesium oxide, nickel oxide, calcium oxide and many others. Moreover, other gels, having a physical structure similar to that of silica gel may be used in place of the latter, for example, the gels of tungstic oxide, stannic oxide, aluminum oxide, etc., may be impregnated with the various oxides in a manner substantially as described above. On account of the greater chemical inertness of silica gel and its resistance to attack by reagents, together with its low cost, I usually prefer to employ it in the practice of my invention.

It is, of course, obvious that, after impregnation, the oxide or hydroxide may be reduced to the metal.

A catalyst comprising two or more metallic oxides or metals may be made by treating the hydrogel with an alkali and two or more salts as described herein.

The term "hydrogel," as used in the claims, is to be understood as designating, the jelly-like mass, into which the "hydrosol" hardens or sets. Furthermore, the term is used to designate only such hydrogels, that when properly dried, will become hard, porous gels, having pores of such size that the water content of the gel, when in equilibrium with water vapor at 30° C. and a partial pressure of 22 mm. of mercury is substantially 21% of its weight. Some methods of the proper drying, mentioned above have been described in this specification. For example, one method consists in drying in a current of air at 75° to 120° C. Another method consists in drying at 75° to 120° C. to drive off part of the moisture and then raising the temperature to 300° to 400° C.

Having thus described the invention what is claimed as new and desired to be secured by Letters Patent is:

1. The process of preparing a catalytic agent, comprising treating a hydrogel of the character described capable of being converted into material having pores of such size that the water content at 30° C. when in equilibrium with water vapor at substantially 22 mm. of mercury will be at least 21% of the weight thereof, with a dilute solution of alkali and thereafter with a solution of a salt of a metal capable of forming a catalyst by reaction with the alkali.

2. The process of preparing a catalytic agent, comprising treating a hydrogel of silicic acid, of the character described capable of being converted into material having pores of such size that the water content at 30° C. when in equilibrium with water vapor at substantially 22 mm. of mercury will be at least 21% of the weight thereof, with a dilute solution of alkali and thereafter with a solution of a salt of a metal capable of forming a catalyst by reaction with the alkali.

3. The process of preparing a catalytic agent, consisting in treating a hydrogel of the character described capable of being converted into material having pores of such size that the water content at 30° C. when in equilibrium with water vapor at substantially 22 mm. of mercury will be at least 21% of the weight thereof, with a dilute solution of alkali for a sufficient length of time for the alkali to become concentrated within the pores thereof, removing the hydrogel from the solution, rinsing it, treating it with a dilute solution of a salt of a metal capable of forming a catalyst by reaction with the alkali, washing and drying.

4. The process of preparing a catalytic agent, consisting in treating a hydrogel of silicic acid, of the character described capable of being converted into material having pores of such size that the water content at 30° C. when in equilibrium with water vapor at substantially 22 mm. of mercury will be at least 21% of the weight thereof, with a dilute solution of alkali for a sufficient length of time for the alkali to become concentrated within the pores thereof, removing the hydrogel from the solution, rinsing it, treating it with a dilute solution of a salt of a metal capable of forming a catalyst by reaction with the alkali, washing and drying.

5. In the process of preparing a catalytic agent, the steps of treating a hydrogel of the character described capable of being converted into material having pores of such size that the water content at 30° C. when in equilibrium with water vapor at substantially 22 mm. of mercury will be at least 21% of the weight thereof, with a dilute solution of an alkali, and thereafter treating with a solution of a salt of a metal capable of forming a catalyst and whose hydroxide is insoluble.

6. In the process of preparing a catalytic agent, the steps of treating a hydrogel of the character described capable of being converted into material having pores of such size that the water content at 30° C. when in equilibrium with water vapor at substantially 22 mm. of mercury will be at least 21% of the weight thereof, with a dilute solution of an alkali, and thereafter treating with a solution of a salt of a metal whose hydroxide is insoluble and whose oxide acts as a catalyst.

7. The process of preparing a catalytic agent, consisting in treating a hydrogel of the character described capable of being converted into material having pores of such size that the water content at 30° C. when in equilibrium with water vapor at substantially 22 mm. of mercury will be at least 21% of the weight thereof, with a solution of alkali the concentration of which is about 0.005 N to 0.05 N, for about 8 to 10 hours, removing the hydrogel from the solution, rinsing it with water, submerging it in a substantially 0.1 molar solution of a salt of a metal capable of forming a catalyst by reaction with the alkali, washing and drying.

8. The process of preparing a catalytic agent, consisting in treating a hydrogel of silicic acid, of the character described capable of being converted into material having pores of such size that the water content at 30° C. when in equilibrium with water vapor at substantially 22 mm. of mercury will be at least 21% of the weight thereof, with a solution of alkali the concentration of which is about 0.005 N to 0.05 N, for about 8 to 10 hours, removing the hydrogel from the solution, rinsing it with water, submerging it in a substantially 0.1 molar solution of a salt of a metal capable of forming a catalyst by reaction with the alkali, washing and drying.

9. The process of preparing a catalytic agent, consisting in treating a hydrogel of the character described capable of being converted into material having pores of such size that the water content at 30° C. when in equilibrium with water vapor at substantially 22 mm. of mercury will be at least 21% of the weight thereof, with a solution of alkali the concentration of which is about 0.005 to 0.05 N, for about 8 to 10 hours, removing the hydrogel from the solution, rinsing it with water, submerging it in a substantially 0.1 molar solution of ferric nitrate for about 5 to 6 hours, washing and drying.

10. The process of preparing a catalytic agent, consisting in treating a hydrogel of silicic acid, of the character described capable of being converted into material having pores of such size that the water content at 30° C. when in equilibrium with water vapor at substantially 22 mm. of mercury will be at least 21% of the weight thereof, with a solution of alkali the concentration of which is about 0.005 N to 0.05 N, for about 8 to 10 hours, removing the hydrogel from the solution, rinsing it with water, submerging it in a substantially 0.1 molar solution of ferric nitrate for about 5 to 6 hours, washing and drying.

11. The process of preparing a catalytic agent, comprising treating a hydrogel of the character described, capable of being converted into material having pores of such a size that the water content at 30° C., when in equilibrium with water vapor at a partial pressure of at least 22 mm. of mercury, will be about 21% of the weight thereof, with a dilute solution of alkali and thereafter with a solution of a salt of a metal capable of precipitating a catalyst by reaction with the alkali.

12. The process of preparing a catalytic agent, comprising treating a hydrogel of silicic acid, of the character described, capable of being converted into material having pores of such a size that the water content at 30° C., when in equilibrium with water vapor at a partial pressure of substantially 22 mm. of mercury, will be at least 21% of the weight thereof, with a dilute solution of alkali and thereafter with a solution of a salt of a metal capable of precipitating a catalyst by reaction with the alkali.

13. The process of preparing a catalytic agent, consisting in treating a hydrogel of the character described, capable of being converted into material having pores of such a size that the water content at 30° C., when in equilibrium with water vapor at a partial pressure of substantially 22 mm. of mercury, will be at least 21% of the weight thereof, with a dilute solution of alkali for a sufficient length of time for the alkali to become concentrated within the pores thereof, removing the hydrogel from the solution, rinsing it, treating it with a dilute solution of a salt of a metal capable of precipitating a catalyst by reaction with the alkali, washing and drying.

14. The process of preparing a catalytic agent, consisting in treating a hydrogel of silicic acid, of the character described, capable of being converted into material having pores of such a size that the water content at 30° C., when in equilibrium with water vapor at a partial pressure of substantially 22 mm. of mercury, will be at least 21% of the weight thereof, with a dilute solution of alkali for a sufficient length of time for the alkali to become concentrated within the pores thereof, removing the hydrogel from the solution, rinsing it, treating it with a dilute solution of a salt of a metal capable of precipitating a catalyst by reaction with the alkali, washing and drying.

15. The process of preparing a catalytic agent, consisting in treating a hydrogel of the character described, capable of being converted into material having pores of such a size that the water content at 30° C., when in equilibrium with water vapor at a partial pressure of substantially 22 mm. of mercury, will be at least 21% of the weight thereof, with a solution of alkali, the concentration of which is about 0.005 N. to 0.05 N., for about 8 to 10 hours, removing the hydrogel from the solution, rinsing it with water, submerging it in a substantially 0.1 molar solution of a salt of a metal capable of precipitating a catalyst by reaction with the alkali, washing and drying.

16. The process of preparing a catalytic agent, consisting in treating a hydrogel of silicic acid, of the character described, capable of being converted into material having pores of such a size that the water content at 30° C., when in equilibrium with water vapor at a partial pressure of substantially 22 mm. of mercury, will be at least 21% of the weight thereof, with a solution of alkali, the concentration of which is 0.005 N. to 0.05 N., for about 8 to 10 hours, removing the hydrogel from the solution, rinsing it with water, submerging it in a substantially 0.1 molar solution of a salt of a metal capable of precipitating a catalyst by reaction with the alkali, washing and drying.

In testimony whereof I hereunto affix my signature.

WALTER A. PATRICK.